US012138839B2

(12) United States Patent
Minowa et al.

(10) Patent No.: US 12,138,839 B2
(45) Date of Patent: Nov. 12, 2024

(54) INJECTION MOLDING MACHINE MANAGEMENT SYSTEM

(71) Applicant: Seiko Epson Corporation, Tokyo (JP)

(72) Inventors: Hiroki Minowa, Matsumoto (JP);
Kazuhiko Tsuchimoto, Matsumoto (JP); Takuya Higuchi, Yamagata (JP);
Yuji Saito, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 423 days.

(21) Appl. No.: 17/522,967

(22) Filed: Nov. 10, 2021

(65) Prior Publication Data

US 2022/0143887 A1    May 12, 2022

(30) Foreign Application Priority Data

Nov. 11, 2020   (JP) ................. 2020-187945

(51) Int. Cl.
*G05B 19/418*      (2006.01)
*B29C 45/76*       (2006.01)

(52) U.S. Cl.
CPC ...... *B29C 45/7626* (2013.01); *B29C 45/7686* (2013.01); *G05B 19/4183* (2013.01); *B29C 2045/7633* (2013.01); *B29C 2945/76806* (2013.01); *G05B 2219/2624* (2013.01)

(58) Field of Classification Search
CPC .......... B29C 45/7626; B29C 45/7686; B29C 2045/7633; B29C 2945/76806; B29C 2045/0058; B29C 45/0055; B29C 45/76; G05B 19/4183; G05B 2219/2624
See application file for complete search history.

(56) References Cited

U.S. PATENT DOCUMENTS

| | | | |
|---|---|---|---|
| 10,488,840 B2 | 11/2019 | Sakakibara et al. | |
| 2005/0159835 A1* | 7/2005 | Yamada | G06Q 10/06 700/109 |
| 2007/0135957 A1* | 6/2007 | Ogawa | G05B 23/0243 700/121 |
| 2017/0153616 A1* | 6/2017 | Sakakibara | G05B 19/048 |
| 2021/0149384 A1* | 5/2021 | Dittmer | H04L 43/16 |
| 2021/0354378 A1* | 11/2021 | Truong | B29C 64/176 |

FOREIGN PATENT DOCUMENTS

| | | |
|---|---|---|
| JP | H06-134831 A | 5/1994 |
| JP | H08-013491 A | 1/1996 |
| JP | 2000-029955 A | 1/2000 |
| JP | 2004-355534 A | 12/2004 |
| JP | 2017-102548 A | 6/2017 |

\* cited by examiner

*Primary Examiner* — Christopher E. Everett
(74) *Attorney, Agent, or Firm* — Harness, Dickey & Pierce, P.L.C.

(57) ABSTRACT

There is provided an injection molding machine management system including an injection molding machine configured to mold a molded article with injection molding, a peripheral device configured to perform a post-process of the injection molding, and a control device communicably coupled to the injection molding machine and the peripheral device. The injection molding machine management system includes a generating section configured to generate a common identifier for each of predetermined production units and transmit the common identifier to the peripheral device. Molding data concerning the injection molding and post-process data concerning the post-process are correlated with the common identifier.

3 Claims, 6 Drawing Sheets

INJECTION MOLDING MACHINE MANAGEMENT SYSTEM

The present application is based on, and claims priority from JP Application Serial Number 2020-187945, filed Nov. 11, 2020, the disclosure of which is hereby incorporated by reference herein in its entirety.

BACKGROUND

1. Technical Field

The present disclosure relates to an injection molding machine management system.

2. Related Art

About a management system for an injection molding machine, for example, JP-A-6-134831 (Patent Literature 1) discloses a system including an injection molding machine to which a peripheral device such as a taking-out machine is coupled and a host computer section coupled to the injection molding machine. In this system, the host computer section can collect data relating to the injection molding machine and data relating to the peripheral device.

For example, in the system explained above, data relating to the injection molding machine at the time when a certain molded article is injection-molded and data relating to the peripheral device at the time when post-processing such as machining or inspection of the molded article is performed by the peripheral device can be recorded for each time when those data are acquired. However, for example, even if it is attempted to specify a cause of occurrence of a failure in the molded article based on a time difference between an injection molding process and a post-processing process and using these data, usually, a theoretical time difference and an actual time difference often do not coincide. It is difficult to specify the cause. Even if it is attempted to correlate data by manual work and, for example, specify a failure cause based on the correlated data, it is unrealistic to quickly correlate the data without mistakes.

SUMMARY

According to a first aspect of the present disclosure, there is provided an injection molding machine management system including an injection molding machine configured to mold a molded article with injection molding, a peripheral device configured to perform a post-process of the injection molding, and a control device communicably coupled to the injection molding machine and the peripheral device, the injection molding machine management system including a generating section configured to generate a common identifier for each of predetermined production units and transmit the common identifier to the peripheral device. Molding data concerning the injection molding and post-process data concerning the post-process are correlated with the common identifier.

DESCRIPTION OF EXEMPLARY EMBODIMENTS

A. First Embodiment

Figure 1:
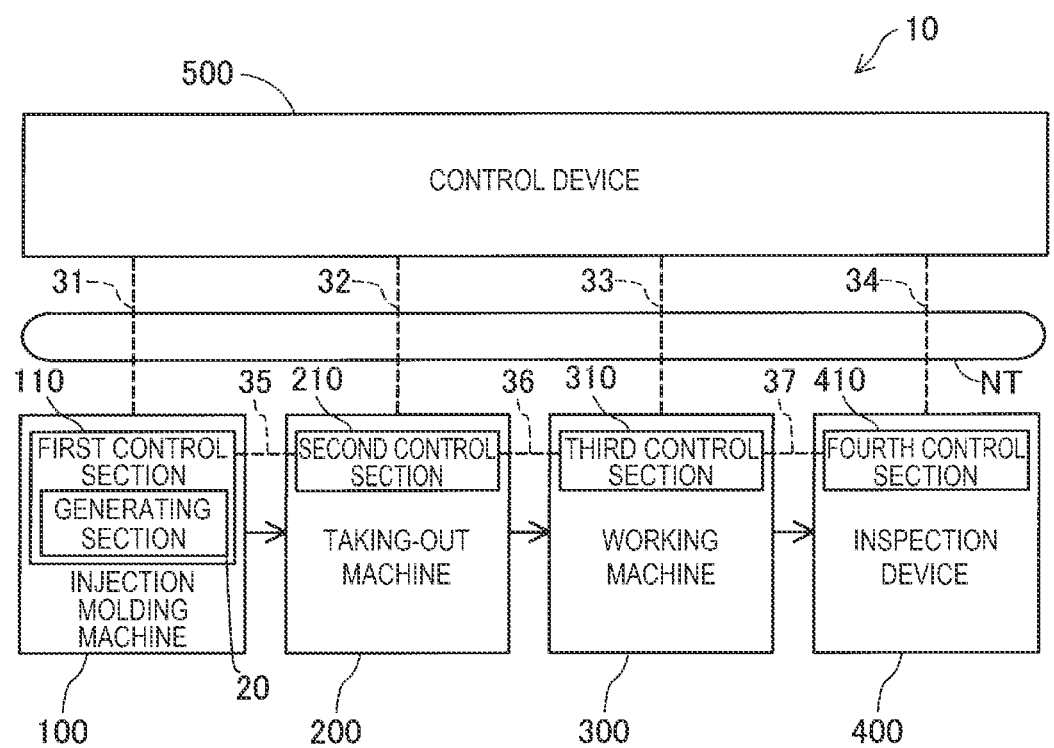
FIG. 1 is a schematic block diagram showing the configuration of an injection molding machine management system in a first embodiment.

FIG. 1 is a schematic block diagram showing the configuration of an injection molding machine management system 10 in a first embodiment. The injection molding machine management system 10 includes an injection molding machine 100 that molds a molded article with injection molding, a taking-out machine 200 that takes out the molded article, a working machine 300 that machines the molded article, an inspection device 400 that inspects the molded article, and a control device 500. The taking-out machine 200, the working machine 300, and the inspection device 400 are peripheral devices of the injection molding machine 100. The peripheral devices mean devices and machines that perform post-processes of injection molding by the injection molding machine 100.

In FIG. 1, a flow of manufacturing of a molded article by the injection molding machine management system 10 is indicated by solid line arrows. The injection molding machine management system 10 molds a molded article with the injection molding machine 100 and performs, with the peripheral devices, post-processing of the molded article molded by the injection molding machine 100 to thereby manufacture the molded article.

The injection molding machine 100 includes a first control section 110 and an injecting section, a mold section including a cavity, and a mold clamping device that clamps the mold section, which are not shown in FIG. 1. The first control section 110 is configured by a computer including one or a plurality of processors, a main storage device, and an input/output interface that performs input and output of signals from and to the outside. The first control section 110 may be configured by a plurality of computers. Control sections of the peripheral devices explained below have the same configuration as the configuration of the first control section 110.

The first control section 110 controls the sections of the injection molding machine 100 to perform injection molding and molds a molded article. More specifically, the first control section 110 controls the injecting section to inject a melted material into the mold section and controls the mold clamping device to clamp the mold section to thereby mold a molded article having a shape corresponding to the shape of the cavity. In this embodiment, the number of cavities of the mold section is one. That is, one molded article is molded by one time of injection molding.

In the injection molding, the first control section 110 acquires molding data, which is data concerning the injection molding of the molded article, using not-shown various sensors or the like. In this embodiment, the first control section 110 acquires, as the molding data, time-series data of pressure and temperature of an injected material, time-series data of a mold clamping force, time information, and the like. The time-series data is data obtained by continuously acquiring sensor values for a predetermined period.

The taking-out machine 200 in this embodiment is configured by a second control section 210, a taking-out robot, and a cutting machine. The taking-out robot is a robot that takes out a molded article from the mold section of the injection molding machine 100. The cutting machine is a machine that removes, from the molded article, a sprue and a runner molded together with the molded article in the mold section by cutting the sprue and the runner. The taking-out robot in this embodiment directly grips and takes out, with an end effector attached to the distal end of an arm of the taking-out robot, the molded article released from the mold section by an ejector pin of the injection molding machine 100. Thereafter, the taking-out machine 200 removes, with the cutting machine, the sprue and the runner from the molded article and sends the molded article, from which the sprue and the runner are removed, to the next machining process by the working machine 300. In other embodiments, the taking-out robot may be, for example, a robot that attracts and grips the molded article. The taking-out machine 200 may not include the cutting machine.

The second control section 210 in this embodiment controls the operations of the taking-out robot and the cutting machine. The second control section 210 acquires taking-out data, which is data concerning the taking-out of the molded article, using not-shown various sensors and the like. In this embodiment, the second control section 210 acquires, as the taking-out data, time-series data of vibration at the time when the molded article is taken out, time-series data of vibration at the time when the sprue and the runner are removed, time information, and the like.

The working machine 300 in this embodiment is configured by a third control section 310 and a machining section. The machining section is used to perform finishing of the molded article. The machining section in this embodiment is a polishing tool that polishes the molded article to thereby perform finishing such as removal of burrs of the molded article. In the other embodiments, the machining section may be, for example, a machine that performs finishing such as removal of burrs of the molded article by irradiating ultrasound on the molded article or injecting a polishing agent to the molded article.

The third control section 310 in this embodiment removes burrs and the like of the molded article by controlling the machining section to polish the molded article taken out from the mold section of the injection molding machine 100. The third control section 310 acquires machining data, which is data concerning machining of the molded article, using not-shown various sensors. The machining data include, for example, time-series data of pressure applied to a polishing tool when the molded article is machined, time-series data of vibration, and time information. In the other embodiments, when the taking-out machine 200 does not remove the sprue and the runner, the working machine 300 may remove the sprue and the runner. In this case, the third control section 310 may acquire, as the machining data, for example, time-series data of vibration at the time when the sprue and the runner are removed.

The inspection device 400 in this embodiment is configured by a fourth control section 410 and a camera. The fourth control section 410 controls the camera to photograph the molded article and analyzes a photographed image of the molded article to thereby perform an exterior inspection of the molded article. The fourth control section 410 acquires inspection data, which is data concerning the inspection of the molded article. The inspection data includes, for example, a result of the exterior inspection and time information. Data concerning a post-process of the molded article is sometimes referred to as post-process data. Therefore, the taking-out data, the machining data, and the inspection data explained above are the post-process data.

The control device 500 is configured by a computer including one or a plurality of processors, a main storage device, and an input/output interface that performs input and output of signals from and to the outside. The control device 500 may be configured by a plurality of computers.

The control device 500 is communicably coupled to the injection molding machine 100 and the peripheral devices. As shown in FIG. 1, the control device 500, the injection molding machine 100, and the peripheral devices are configured to be capable of communicating with one another via a network NT. In the network NT, a communication path connecting the first control section 110 and the control device 500 is sometimes referred to as first communication path 31, a communication path connecting the second control section 210 and the control device 500 is sometimes referred to as second communication path 32, a communication path connecting the third control section 310 and the control device 500 is sometimes referred to as third communication path 33, and a communication path connecting the fourth control section 410 and the control device 500 is sometimes referred to as fourth communication path 34. In the network NT, a communication path connecting the first control section 110 and the second control section 210 is sometimes referred to as fifth communication path 35, a communication path connecting the second control section 210 and the third control section 310 is sometimes referred to as sixth communication path 36, and a communication path connecting the third control section 310 and the fourth control section 410 is sometimes referred to as seventh communication path 37. The control device 500 in this embodiment communicates with the injection molding machine 100 and the peripheral devices via the network NT to thereby, for example, grasp operation information of the injection molding machine 100 and the peripheral devices, transmit and receive data to and from the injection molding machine 100 and the peripheral devices, and transmit a control program to the injection molding machine 100 and the peripheral devices. The network NT may be, for example, a LAN, may be a WAN, or may be the Internet.

The injection molding machine management system 10 includes a generating section 20. The generating section 20 generates a common identifier for each of predetermined production units and transmits the common identifier to the peripheral devices. In this embodiment, the first control section 110 functions as the generating section 20. That is, the injection molding machine 100 in this embodiment includes the generating section 20.

The production units represent units of quality management in the injection molding machine management system 10. In this embodiment, shot, tray, box, and lot are used as the production units. The shot is a unit representing one molded article molded by the injection molding machine 100. The tray is a unit equivalent to a plurality of shots. The box is a unit equivalent to a plurality of trays. The lot is a unit equivalent to a plurality of boxes. Therefore, the unit of quality management increases in size in the order of the shot, the tray, the box, and the lot. In this embodiment, specifications such as a shape of a molded article are decided for each lot. In this embodiment, the production units are respectively represented as numbers. The production units represented as the numbers are sometimes referred to as shot number, tray number, box number, and lot number.

Figure 2:
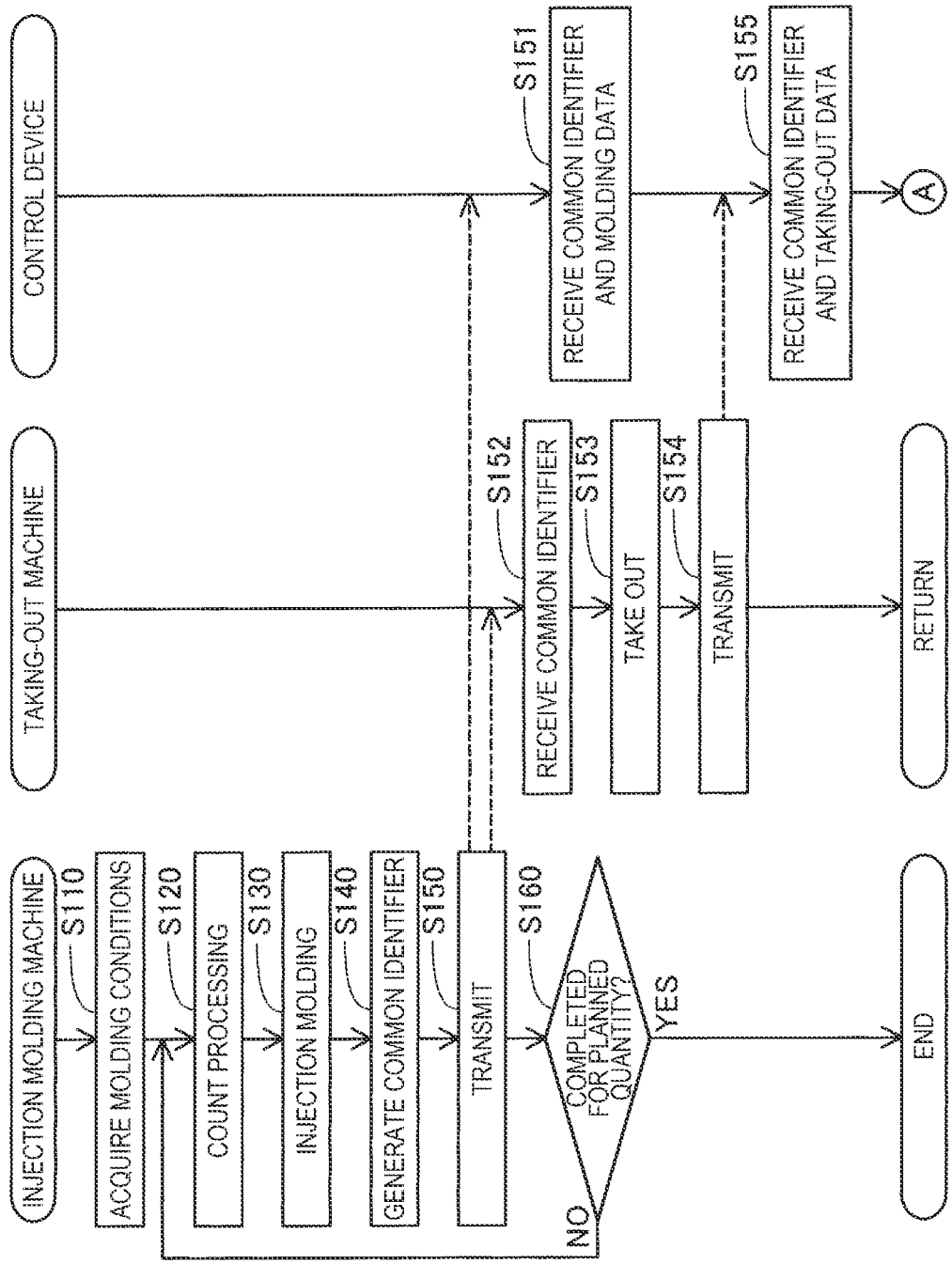
FIG. 2 is a flowchart showing a former half portion of molded article manufacturing processing in the first embodiment.
Figure 3:
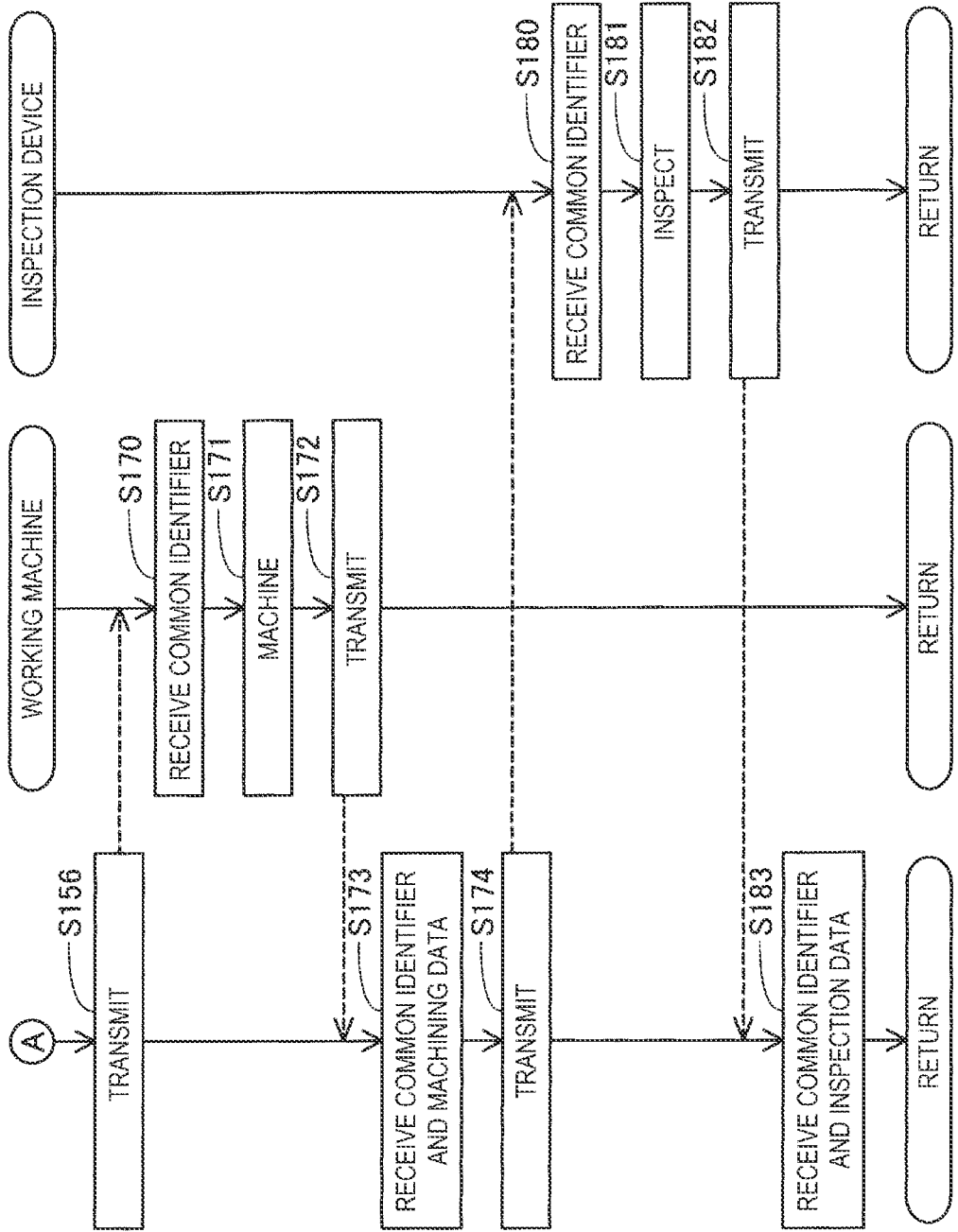
FIG. 3 is a flowchart showing a latter half portion of the molded article manufacturing processing in the first embodiment.

FIG. 2 is a flowchart showing a former half portion of molded article manufacturing processing in this embodiment. FIG. 3 is a flowchart showing a latter half portion of the molded article manufacturing processing in this embodiment. The molded article manufacturing processing is processing executed in order to manufacture a molded article in the injection molding machine management system 10. In FIG. 2, in the molded article manufacturing processing, processing executed by the first control section 110 of the injection molding machine 100, processing executed by the second control section 210 of the taking-out machine 200, and processing executed by the control device 500 are written together. In FIG. 3, in the molded article manufacturing processing, processing executed by the control device 500, processing executed by the third control section 310 of the working machine 300, and processing executed by the fourth control section 410 of the inspection device 400 are written together.

As explained above, when a molded article is manufactured in the injection molding management system 10, first, the injection molding machine management system 10 molds a molded article with the injection molding machine 100. In step S110 in FIG. 2, the first control section 110 acquires, as molding conditions, a molding program for manufacturing a molded article and a quantity of the manufacturing of the molded article. The first control section 110 acquires the molding program based on a lot number input by a user via, for example, a not-shown input device of the injection molding machine 100. The first control section 110 acquires a quantity input by the user via, for example, the not-shown input device of the injection molding machine 100. The quantity of the molded article acquired in step S110 is hereinafter referred to as planned quantity as well.

The molding program is a program for performing injection molding once in the injection molding machine 100. Timing for changing control values of the injecting section, the mold clamping device, and the like, magnitudes of the control values, and the like are designated. The molding program in this embodiment includes a command for executing count processing, generation processing for the common identifier, and transmission processing for the common identifier explained below. The molding program is, for example, transmitted from the control device 500 to the first control section 110 in advance and recorded in a storage device included in the first control section 110. The molding program in this embodiment is created in advance for each of lot numbers.

The first control section 110 executes the following steps S120 to S160 according to the molding program acquired in step S110. In the following explanation, the steps are explained using an example of manufacturing molded article manufacturing in which one tray corresponds to twenty shots and ten trays correspond to one box.

In step S120, the first control section 110 executes count processing. The count processing indicates processing for counting a production unit when injection molding is executed next. The count processing is processing executed in order to perform generation processing for a common identifier explained below. In this embodiment, in the count processing, the first control section 110 counts an increase in a shot number, an increase in a tray number due to the increase in the shot number, and an increase in a box number. For example, when a shot number at a point in time when step S120 is executed is 0, the first control section 110 counts the next shot number as 1, counts the next tray number as 1, and counts the next box number as 1. When a shot number at a point in time when step S120 is executed is 20, the first control section 110 counts the next shot number as 21 obtained by adding 1 to 20. Further, since one tray in this embodiment corresponds to twenty shots as explained above, the first control section 110 counts the next tray number as 2. In this case, the first control section 110 continuously counts the next box number as 1.

In step S130, the first control section 110 controls the injecting section and the mold clamping device of the injection molding machine 100 and performs injection molding according to the molding program. Consequently, a material is injected into the mold section of the injection molding machine 100. A molded article is molded in the mold section. In step S130, the first control section 110 acquires, with the various sensors or the like, molding data at the time when the molded article is injection-molded.

In step S140, the first control section 110 generates a common identifier. In this embodiment, the first control section 110 generates one common identifier for each shot number. More specifically, in step S140, the first control section 110 generates, based on the production units counted in step S120, as the common identifier, a ten-digit number reflecting the lot number, the box number, the tray number, and the shot number. More specifically, a first digit of the common identifier corresponds to the lot number, second and third digits correspond to the box number, fourth to sixth digits correspond to the tray number, and seventh to tenth digits correspond to the shot number. For example, when a common identifier of a certain molded article is "1010020021", this indicates that the molded article is a molded article, a lot number of which is 1, a box number of which is 1, a tray number of which is 2, and a shot number of which is 21. Since the common identifier reflects the production units, from a common identifier of a certain molded object, not only a shot number of the molded article but also a tray number, a box number, and a lot number of the molded article can be easily known. The generation of the common identifier may be performed, for example, during a pressure retaining operation for staying on standby while keeping on applying pressure to the molded article in the mold section for a predetermined time. In this case, since a time loss due to the generation of the common identifier is reduced, the molded article can be more efficiently manufactured.

In step S150, the first control section 110 transmits the generated common identifier to the second control section 210 of the taking-out machine 200 via the fifth communication path 35. Further, in step S150, the first control section 110 transmits the generated common identifier and the molding data acquired in step S130 to the control device 500 via the first communication path 31.

In step S160, the first control section 110 determines whether the molding of the planned quantity of the molded article is completed. When determining that the molding of the planned quantity of the molded article is not completed, the first control section 110 returns the processing to step S120 and, in order to mold the next molded article, executes the processing in steps S120 to S150 again according to the molding program. When determining that the molding of the planned quantity of the molded article is completed, the first control section 110 ends the manufacturing processing for the molded article in the injection molding machine 100.

In step S151, the control device 500 receives the common identifier and the molding data transmitted from the first control section 110 to the control device 500 in step S150 and records the common identifier and the molding data in the storage device of the control device 500 in correlation with each other. For example, when a molded article M1 is molded in step S130, in step S151, the control device 500 receives a common identifier of the molded article M1 and molding data of the molded article M1 and records the common identifier and the molding data in the storage device of the control device 500 in correlation with each other.

In step S152, the second control section 210 of the taking-out machine 200 receives the common identifier transmitted from the first control section 110 in step S150. In step S153, the second control section 210 controls the taking-out robot configuring the taking-out machine 200, takes out the molded article molded in step S130 from the mold section of the injection molding machine 100, and, subsequently, removes a sprue and a runner with the cutting machine. In step S153, as explained above, the second control section 210 acquires, using the various sensors and the like of the taking-out machine 200, taking-out data at the time when the molded article is taken out. When the common identifier of the certain molded article M1 is received in step S152, in step S153, the molded article M1 is taken out from the mold section of the injection molding machine 100.

In step S154, the second control section 210 transmits the common identifier of the molded article acquired in step S152 and the taking-out data relating to the molded article taken out in step S153 to the control device 500 via the second communication path 32.

In step S155, the control device 500 receives the common identifier and the taking-out data transmitted from the second control section 210 in step S154 and records the common identifier and the taking-out data in the storage device of the control device 500 in correlation with each other. For example, when the molded article M1 is taken out in step S153, in step S155, the control device 500 receives a common identifier of the molded article M1 and taking-out data of the molded article M1 and records the common identifier and the taking-out data in the storage device of the control device 500 in correlation with each other. Consequently, the molding data and the taking-out data relating to the molded article M1 are correlated with the common identifier of the molded article M1.

In step S156 in FIG. 3, the control device 500 transmits the common identifier acquired in step S155 in FIG. 2 to the third control section 310 of the working machine 300 via the third communication path 33.

In step S170 in FIG. 3, the third control section 310 receives the common identifier transmitted from the control device 500 in step S156. Subsequently, in step S171, the third control section 310 controls the machining section of the working machine 300 to thereby machine the molded article taken out in step S153. In step S170, as explained above, the third control section 310 acquires, using the various sensors and the like of the working machine 300, taking-out data at the time when the molded article is machined. When the common identifier of the certain molded article M1 is received in step S170, the molded article M1 is machined in step S171.

In step S172, the third control section 310 transmits the common identifier of the molded article acquired in step S170 and machining data relating to the molded article machined in step S171 to the control device 500 via the third communication path 33.

The third control section 310 may not perform alternately once each of the reception of the common identifier in step S170 and the machining of the molded article M1 in step S171. For example, the third control section 310 may receive, while the machining of the molded article M1 is performed, a common identifier of a molded article M2 molded subsequently to the molded article M1 and a common identifier of a molded article M3 molded subsequently to the molded article M2. In this case, the third control section 310 machines the molded articles in shot number order, acquires machining data at the time when the molded articles are machined, and transmits the common identifiers in reception order and transmits the machining data in acquisition order to the control device 500. In this case, for example, the molded articles completed to be taken out are arrayed in the shot number order and the working machine 300 can machine the molded articles in the shot number order by machining the molded articles in array order.

In step S173, the control device 500 receives the common identifier and the machining data transmitted from the third control section 310 in step S172 and records the common identifier and the machining data in the storage device of the control device 500 in correlation with each other. For example, when the molded article M1 is machined in step S171, in step S173, the control device 500 receives the common identifier of the molded article M1 and the machining data of the molded article M1 and records the common identifier and the machining data in the storage device of the control device 500 in correlation with each other. Consequently, the molding data, the taking-out data, and the machining data of the molded article M1 are correlated with the common identifier of the molded article M1.

In step S174, the control device 500 transmits the common identifier acquired in step S174 to the fourth control section 410 of the inspection device 400 via the fourth communication path 34.

In step S180, the fourth control section 410 receives the common identifier transmitted from the control device 500 in step S174. Subsequently, in step S181, the fourth control section 410 controls the camera provided in the inspection device 400 to thereby inspect the molded article machined in step S172 to thereby acquire inspection data of the molded article. When the common identifier of the molded article M1 is acquired in step S180, in step S181, the molded article M1 is inspected. Like the third control section 310, the fourth control section 410 may not perform alternately once each of the reception of the common identifier in step S180 and the machining of the molded article M1 in step S181.

In step S182, the fourth control section 410 transmits the common identifier of the molded article acquired in step S180 and the inspection data of the molded article inspected in step S181 to the control device 500 via the fourth communication path 34.

In step S183, the control device 500 receives the common identifier and the inspection data transmitted from the fourth control section 410 in step S182 and records the common identifier and the inspection data in the storage device of the control device 500 in correlation with each other. For example, when the molded article M1 is inspected in step S181, in step S183, the control device 500 acquires the common identifier of the molded article M1 and the inspection data of the molded article M1 and records the common identifier and the inspection data in the storage device of the control device 500 in correlation with each other. Consequently, the molding data, the taking-out data, the machining data, and the inspection data relating to the molded article M1 are correlated with the common identifier of the molded article M1. The control device 500 may display the correlated data on a not-shown display device. In this case, for example, the control device 500 may display the data correlated with the common identifier as a list or may display, according to a common identifier input from the user, data correlated with the common identifier.

In the molded article manufacturing processing, for example, when the lot number is changed, the first control section 110 may execute initialization processing, which is processing for resetting the count of the production unit to 0. For example, in this embodiment, after the completion of the molding of the planned quantity of the molded article or before the start of the first count processing, by overwriting the counts of the shot number, the tray number, and the box number on 0, the first control section 110 can reset the counts of these numbers to 0 when the lot number is changed. Consequently, the shot number, the tray number, and the box number are counted from 1 for each lot number. A common identifier is generated as a number reflecting the counts. Accordingly, compared with when the initialization processing is not executed when the lot number is changed, it is easier to grasp, from the common identifier, manufacturing order, the quantity, and the like of molded articles in a lot. It is easier to perform quality control for each lot.

The injection molding machine management system 10 in this embodiment explained above includes the generating section 20 that generates a common identifier for each of the predetermined production units and transmits the common identifier to the peripheral devices. The molding data and the post-process data are correlated with the common identifier. Accordingly, the molding data and the post-process data can be appropriately correlated based on the common identifier. Therefore, for example, when a failure of the molded article occurs, by referring to the molding data and the post-process data correlated based on the common identifier, it is easier to specify a cause of the failure than when the cause of the failure is specified based on time and a time difference between processes. Therefore, efficiency of quality management and production management in the manufacturing of the molded article is improved. Specifically, for example, when the cause of the failure is specified, by changing the molding program of the injection molding machine 100, the control values of the peripheral devices, and the like, to solve the cause, it is possible to improve the quality and a yield rate of the molded article to be manufactured. As in this embodiment, when the time information is included in the molding data and the post-process data, it is possible to easily refer to, based on a common identifier of a certain molded article, time when the molded article is molded and time when the molded article is subjected to post-processing. Therefore, it is possible to easily grasp timing when a failure of the molded article occurred.

In this embodiment, the injection molding machine 100 includes the generating section 20. Accordingly, compared with when the generating section 20 is provided in the control device 500 or the like different from the injection molding machine 100, it is easier for the generating section 20 to acquire information concerning the production units in the injection molding machine 100. Therefore, the generating section 20 can generate, according to simple control, a common identifier for each of the predetermined production units.

In this embodiment, the peripheral device is any one of the taking-out machine 200, the working machine 300, and the inspection device 400. Accordingly, irrespective of whether the peripheral device is the taking-out machine 200, the working machine 300, and the inspection device 400, it is possible to appropriately correlate the molding data and the post-process data based on the common identifier.

In the other embodiments, the generating section 20 may generate the common identifier not for each shot number but for, for example, each tray number or each box number. For example, when the generating section 20 generates the common identifier for each tray number, the first control section 110 of the injection molding machine 100 acquires molding data for twenty shots equivalent to one tray as molding data for one tray. While performing injection molding for one tray or after completing the injection molding for one tray, the first control section 110 transmits the common identifier to the control section of the peripheral device such as the taking-out machine 200. Further, after completing the injection molding for one tray, the first control section 110 transmits the common identifier and the molding data for one tray to the control device 500. Similarly, the control section of the peripheral device acquires post-process data for a post-process equivalent to one tray as post-process data for one tray and transmits the common identifier and the post-process data to the control device 500. The control device 500 stores the received common identifier and the received molding data and the received post-process data in the storage device of the control device 500 in correlation with each other. With such an aspect as well, it is possible to appropriately correlate the molding data and the post-process data based on the common identifier. In this case, it is preferable that, before first molded article among molded articles for one tray reaches the peripheral device, the control section of the peripheral device receives a common identifier for the tray. Consequently, before starting acquisition of post-process data of molded articles for certain one tray, the control section of the peripheral device can receive a common identifier corresponding to the one tray. Therefore, it is possible to transmit the post-process data for the one tray and the common identifier corresponding to the post-process data to the control device 500 without using an identifier or the like other than the common identifier. Accordingly, it is possible to more simply execute the molded article manufacturing processing. The same applies, for example, when the generating section 20 generates a common identifier for each box number.

In the other embodiments, the injection molding machine management system 10 may include two or more injection molding machines 100 that mold molded articles having lot numbers different from one another. In this case, in step S171 in FIG. 3, the third control section 310 machines the molded articles in lot number order or, if lot numbers are the same, in shot number order, acquires machining data at the time when the molded articles are machined, and transmits the machining data to the control device 500 in ascending order of numbers of common identifiers and in order of the acquisition of the machining data. For example, when a molded article having a lot number 1 and a shot number 3 is molded by a certain injection molding machine 100 and a molded article having a lot number 2 and a shot number 2 is molded by another injection molding machine 100, the third control section 310 machines the molded article having the lot number 1 and the shot number 3 earlier than the molded article having the lot number 2 and the shot number 2. In this case, for example, molded articles completed to be taken out are arrayed in lot number order or, if lot numbers are the same, in shot number order and the working machine 300 machines the molded articles in the order of the array, whereby it is possible to machine the molded articles in lot number order or, if lot numbers are the same, in shot number order. The fourth control section 410 of the inspection device 400 can perform inspection of molded articles and transmission of common identifiers and inspection data in the same manner.

B. Second Embodiment

Figure 4:
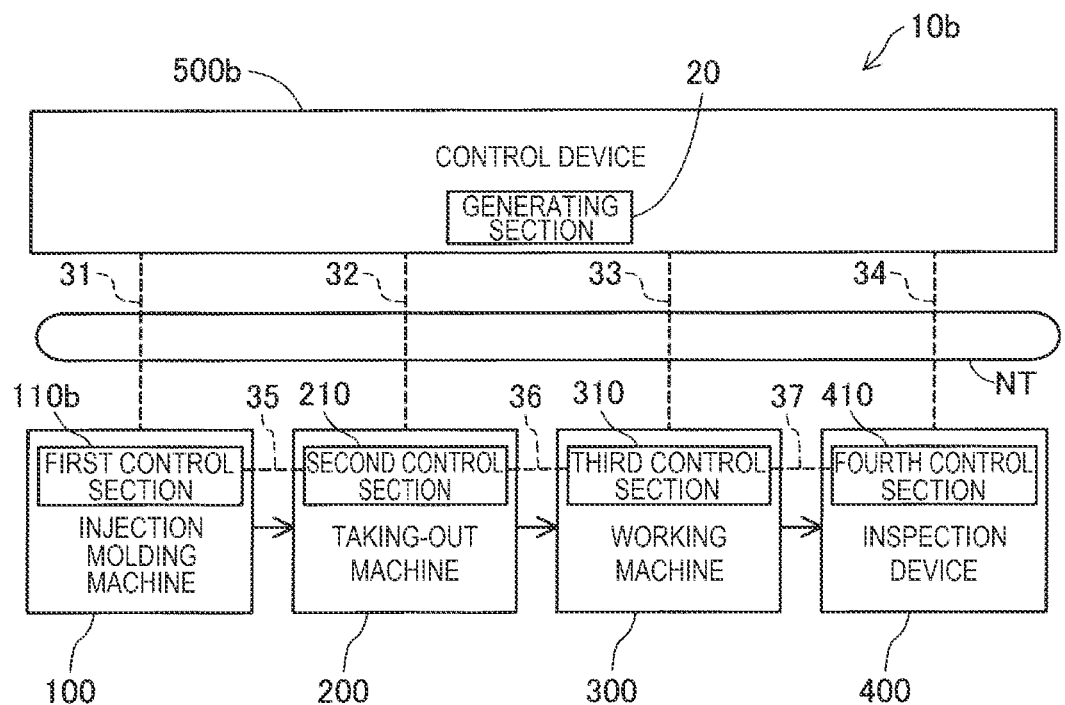
FIG. 4 is a schematic block diagram showing the configuration of an injection molding machine management system in a second embodiment.

FIG. 4 is a schematic block diagram showing the configuration of an injection molding machine management system 10*b* in a second embodiment. In this embodiment, unlike the first embodiment, not a first control section 110*b* but a control device 500*b* includes the generating section 20. Portions not particularly explained among components of the injection molding management system 10*b* in this embodiment are the same as the portions in the first embodiment.

As shown in FIG. 4, the control device 500*b* in this embodiment includes the generating section 20. More specifically, in this embodiment, the control device 500*b* functions as the generating section 20.

Figure 5:
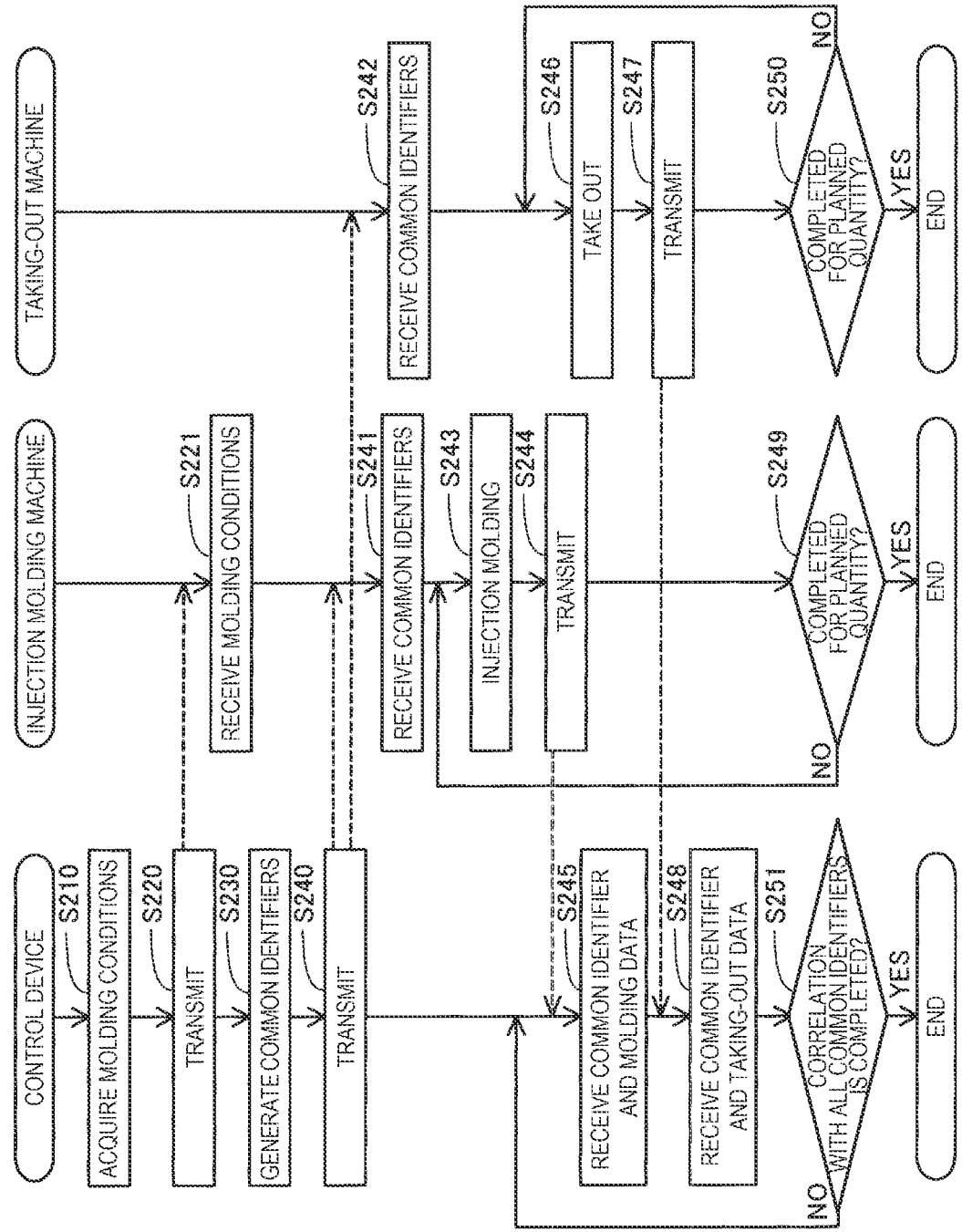
FIG. 5 is a flowchart showing molded article manufacturing processing in the second embodiment.

FIG. 5 is a flowchart showing molded article manufacturing processing in the second embodiment. In FIG. 5, in the molded article manufacturing processing, processing executed by the first control section 110*b* of the injection molding machine 100, processing executed by the second control section 210 of the taking-out machine 200, and processing executed by the control device 500*b* are written together. In FIG. 5, processing executed by the third control section 310 of the working machine 300 and processing executed by the fourth control section 410 of the inspection device 400 are omitted.

In step S210, the control device 500*b* acquires molding conditions. The molding conditions acquired in step S210 are a planned quantity and a molding program like the molding conditions acquired by the first control section 110 in step S110 in FIG. 2. The molding program in this embodiment does not include count processing, generation processing for a common identifier, and transmission processing for the common identifier. In step S220, the control device 500*b* transmits the acquired molding conditions to the first control section 110*b* of the injection molding machine 100 via the first communication path 31. In step S221, the first control section 110*b* receives the molding conditions transmitted from the control device 500*b*.

In step S230, the control device 500*b* generates common identifiers. In step S230, the control device 500*b* in this embodiment generates, in advance, common identifiers for each shot by a planned quantity included in the molding conditions acquired in step S210. For example, if the planned quantity is 1000 shots, in step S230, the control device 500*b* generates 1000 common identifiers. In step S240, the control device 500*b* transmits all the common identifiers generated in step S230 to the first control section 110*b* and control sections of all peripheral devices via the first communication path 31, the second communication path 32, the third communication path 33, and the fourth communication path 34. More specifically, in step S240, the control device 500*b* transmits common identifier data, which is data in which the common identifiers are arrayed in ascending order, to the first control section 110*b* and the control sections of the peripheral devices.

In step S241, the first control section 110*b* receives the common identifier data transmitted from the control device 500*b*. Similarly, in step S242, the second control section 210 of the taking-out machine 200 receives the common identifier data transmitted from the control device 500*b*.

In step S243, the first control section 110*b* performs injection molding as in step S130 in FIG. 2. In step S244, the first control section 110*b* transmits a common identifier and molding data acquired in step S243 to the control device 500*b* via the first communication path 31. More specifically, the first control section 110*b* transmits the molding data acquired in step S243 and a common identifier having a minimum value among un-transmitted common identifiers included in the common identifier data to the control device 500*b*.

In step S245, the control device 500*b* receives the common identifier and the molding data transmitted from the first control section 110*b* and records the common identifier and the molding data in a storage device of the control device 500*b* in correlation with each other.

In step S246, the second control section 210 takes out a molded article injection-molded in step S243 with the same method as in step S153 in FIG. 2. In step S247, the second control section 210 transmits a common identifier and taking-out data acquired in step S246 to the control device 500*b* via the second communication path 32. More specifically, the second control section 210 transmits the taking-out data acquired in step S246 and a common identifier having a minimum value among un-transmitted common identifiers included in the common identifier data to the control device 500*b*. Consequently, in step S247, the same common identifier as the common identifier transmitted to the control device 500*b* in step S244 is transmitted to the control device 500*b*.

In step S248, the control device 500*b* receives the common identifier and the taking-out data transmitted from the second control section 210 and records the common identifier and the taking-out data in the storage device of the control device 500*b* in correlation with each other. Consequently, the taking-out data is further correlated with the common identifier with which the molding data is correlated in step S245.

In step S249, the first control section 110*b* determines whether the molding of the planned quantity of the molded article is completed. When determining that the molding of the planned quantity of the molded article is not completed, the first control section 110*b* returns the processing to step S243 and starts molding of the next molded article. When determining that the molding of the planned quantity of the molded article is completed, the first control section 110*b* ends the manufacturing processing for the molded article in the injection molding machine 100.

In step S250, the second control section 210 determines whether the taking-out of the planed quantity of the molded article is completed. When determining that the taking-out of the planned quantity of the molded article is not completed, the second control section 210 returns the processing to step S246 and, when the next molded article is molded, takes out the molded article. When determining that the taking-out of the planned quantity of the molded article is completed, the second control section 210 ends the manufacturing processing for the molded article in the taking-out machine 200.

In step S251, the control device 500*b* determines whether the molding data and the post-process data are correlated with all the common identifiers generated in step S230. When determining that the correlation of the data is not completed about all the common identifiers, the control device 500*b* returns the processing to step S245. When determining that the correlation of the data is completed about all the common identifiers, the control device 500*b* ends the molded article manufacturing processing in the control device 500*b*.

In FIG. 5, as explained above, in the molded article manufacturing processing, the processing executed by the third control section 310 of the working machine 300 and the fourth control section 410 of the inspection device 400 is omitted. However, like the second control section 210, after receiving the common identifier data from the control device 500*b*, the third control section 310 and the fourth control section 410 can perform machining and inspection of the molded article as post-processes and transmit the common identifier and the post-process data to the control device 500*b*. The control device 500*b* can correlate the post-process data transmitted from the third control section 310 and the fourth control section 410 with the common identifier.

With the injection molding machine management system 10*b* in the second embodiment explained above, the molding data and the post-process data can be appropriately correlated based on the common identifier. In particular, in this embodiment, the control device 500*b* includes the generating section 20. The generating section 20 transmits the generated common identifier to the injection molding machine 100 and the peripheral devices. Accordingly, even when the injection molding machine 100 and the peripheral devices are not individually communicably configured, the common identifier can be transmitted to the peripheral devices.

C. Third Embodiment

Figure 6:
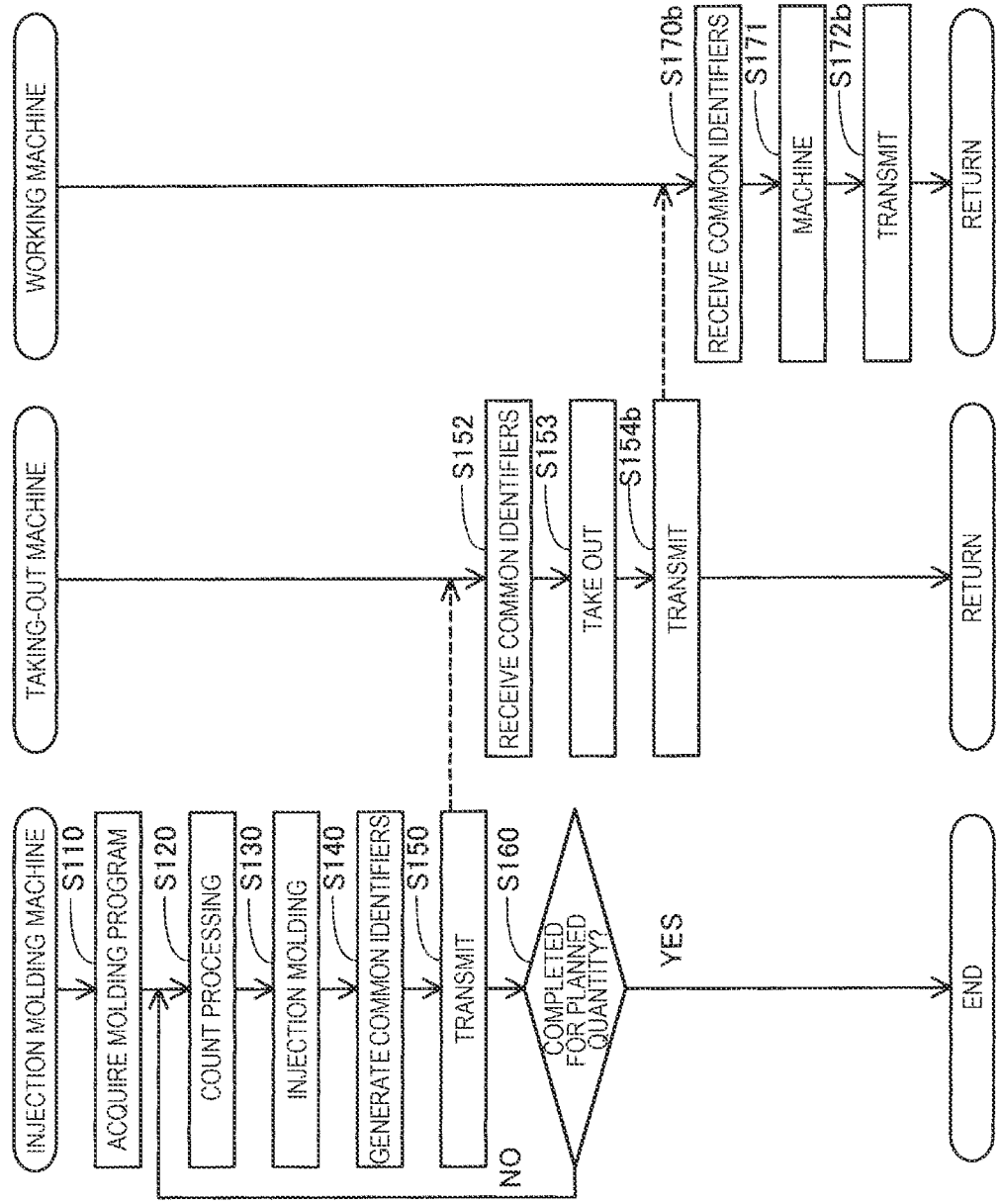
FIG. 6 is a flowchart showing molded article manufacturing processing in a third embodiment.

FIG. 6 is a flowchart showing molded article manufacturing processing in a third embodiment. In FIG. 6, in the molded article manufacturing processing, processing executed by the first control section 110 of the injection molding machine 100, processing executed by the second control section 210 of the taking-out machine 200, and processing executed by the third control section 310 of the working machine 300 are written together. In FIG. 6, processing executed by the fourth control section 410 of the inspection device 400 and processing executed by the control device 500 are omitted. Among steps in FIG. 6, the same steps as the steps in FIG. 2 are denoted by the same sings as the signs of the steps in FIG. 2. Portions not particularly explained among components of the injection molding machine management system 10 in this embodiment are the same as the portions in the first embodiment.

As in the first embodiment, the first control section 110 in this embodiment functions as the generating section 20. In the molded article manufacturing processing, unlike the first embodiment, the first control section 110 in this embodiment transmits a common identifier to peripheral devices not via the control device 500.

In step S154*b*, unlike step S154 in FIG. 2, the second control section 210 of the taking-out machine 200 transmits the common identifier to the third control section 310 of the working machine 300 via the sixth communication path 36 in addition to transmitting the common identifier and the taking-out data to the control device 500.

In step S170*b*, unlike step S170 in FIG. 3, the third control section 310 receives the common identifier transmitted not from the control device 500 but from the second control section 210. Further, in step S172*b*, unlike step S172 in FIG. 3, the third control section 310 transmits the common identifier to the fourth control section 410 of the inspection device 400 via the seventh communication path 37 in addition to transmitting the common identifier and the taking-out data to the control device 500.

In FIG. 6, as explained above, the processing executed by the fourth control section 410 is omitted. However, unlike step S180 in FIG. 3, the fourth control section 410 receives the common identifier transmitted not from the control device 500 but from the third control section 310. Further, the fourth control section 410 performs inspection of the molded article as in step S181 and transmits the common identifier and the post-process data to the control device 500 as in step S182. In this way, the injection molding machine 100 and the peripheral device respectively transmit the common identifiers to the peripheral devices that perform the next steps of the steps performed by the injection molding machine 100 and the peripheral device. Therefore, it is possible to transmit the common identifiers to the peripheral devices not via the control device 500.

With the injection molding machine management system 10 in the third embodiment explained above as well, the molding data and the post-process data can be appropriately correlated based on the common identifier. In particular, in this embodiment, the injection molding machine 100 includes the generating section 20. The generating section 20 transmits the generated common identifier to the peripheral devices not via the control device 500. Consequently, it is possible to reduce the number of times of transmission of data from the control device 500 to the peripheral devices. Therefore, it is possible to reduce a processing load of the control device 500.

D. Other Embodiments (D-1) In the embodiments, the injection molding machine 100 may include a printing section that prints, on a molded article, a barcode, a mark, or the like representing a common identifier. For example, after the taking-out machine 200 takes out the molded article, the printing section may perform laser marking on the molded article. In this case, the working machine 300 or the inspection device 400 may include a camera that reads the common identifier from the printing. With such an aspect, it is possible to easily refer to, based on the common identifier read from the printing, molding data and post-process data of the molded article attached with the common identifier. Therefore, the efficiency of the quality management and the production management is further improved.

(D-2) In the embodiments, the injection molding machine management system 10 includes the taking-out machine 200, the working machine 300, and the inspection device 400 as the peripheral devices to which the common identifier is transmitted from the generating section 20. In contrast, the injection molding machine management system 10 may include, as the peripheral devices, only two or one of the devices described above. The injection molding machine management system 10 may include, as the peripheral devices, machines, devices, and the like other than the devices described above. The injection molding machine management system 10 may include machines, devices, and the like to which the common identifier is not transmitted from the generating section 20.

(D-3) In the embodiments, the production units are the shot, the tray, the box, and the lot. In contrast, the production units may not be the shot, the tray, the box, and the lot. Names of the production units and a correspondence relation among numbers of the production units may be optional. In this case, the production units are preferably decided as, for example, units suitable for performing quality management.

(D-4) In the embodiments, the number of cavities of the mold section of the injection molding machine 100 is one. In contrast, the number of cavities of the mold section may not be one and may be two or more. In this case, since two or more molded articles are molded by one time of the injection molding, when generating the common identifier for each shot number as in the embodiments, the generating section 20 generates two or more common identifiers for each time of the injection molding. In this case, the two or more molded articles molded by one time of the injection molding can be distinguished by, for example, the positions of the cavities of the mold section. For example, when the injection molding is performed using a mold section including two cavities arrayed on the left and the right, the first control section 110 of the injection molding machine 100 and the control sections of the peripheral devices can distinguish two molded articles molded by one time of the injection molding by treating a molded article molded in the cavity on the left side as a molded article corresponding to a common identifier having a smaller number than a number of a common identifier of a molded article molded in the cavity on the right side.

(D-5) In the embodiments, the common identifier is the ten-digit number. In contrast, the common identifier may not be the ten-digit number. For example, the common identifier may be a number consisting of another number of digits, may be a sign such as an alphabet, or may be an identifier represented by a combination of the sign and the number. When the common identifier is generated for each shot number as in the aspect explained above, the common identifier may not reflect the tray number, the box number, and the lot number, which are the production units larger than the shot number. For example, the common identifier may be a number or the like reflecting only the shot number or may be a number or the like reflecting only the shot number and the box number. Further, the common identifier may reflect a date of manufacturing of the molded article or may reflect, for example, a number reflecting a number or the like representing year, month, and date of manufacturing of the molded article and the shot number. When executing initialization processing in this aspect, for example, the first control section 110 may reset the count of the shot number to 0 when the date is changed. In this case, the shot number is counted from one for each date and the common identifier is generated as a number reflecting the count. Therefore, it is easier to perform the quality management for each date.

(D-6) In the embodiments, the first control section 110 of the injection molding machine 100 functioning as the generating section 20 executes the count processing, the common identifier generation processing, and the common identifier transmission processing according to the molding program. In contrast, the first control section 110 may not execute these kinds of processing according to the molding program. For example, the first control section 110 may separately execute the molding program, which does not include these kinds of processing, and these kinds of processing. Timing when the first control section 110 performs the count processing may be any timing before executing the common identifier generation processing or may be, for example, timing immediately before executing the common identifier generation processing.

(D-7) In the embodiments, the control device 500 is communicably coupled to the injection molding machine 100 and the peripheral devices via the network NT. In contrast, the control device 500 may not be communicably coupled to the injection molding machine 100 and the peripheral device via the network NT or may be communicably coupled to, for example, a part or all of the devices via individual communication lines. The injection molding machine 100 and the peripheral devices may be communicably coupled via individual communication lines.

E. Other Aspects

The present disclosure is not limited to the embodiments explained above and can be realized in various aspects without departing from the gist of the present disclosure. For example, the present disclosure can also be realized by aspects descried below. Technical features in the embodiments corresponding to technical features in the aspects described below can be substituted or combined as appropriate in order to solve a part or all of the problems of the present disclosure or achieve a part or all of the effects of the present disclosure. Unless the technical features are explained as essential technical features in this specification, the technical features can be deleted as appropriate.

(1) According to a first aspect of the present disclosure, there is provided an injection molding machine management system including an injection molding machine configured to mold a molded article with injection molding, a peripheral device configured to perform a post-process of the injection molding, and a control device communicably coupled to the injection molding machine and the peripheral device. The injection molding machine management system includes a generating section configured to generate a common identifier for each of predetermined production units and transmit the common identifier to the peripheral device. Molding data concerning the injection molding and post-process data concerning the post-process are correlated with the common identifier.

According to such an aspect, it is possible to correlate the molding data and the post-process data based on the common identifier. Therefore, for example, when a failure of the molded article occurs, it is easier to specify a cause of the failure of the molded article by referring to the molding data and the post-process data correlated based on the common identifier. Therefore, efficiency of quality management and production management in manufacturing of the molded article is improved.

(2) In the aspect, the injection molding machine may include the generating section. According to such an aspect, compared with when the generating section is provided in the control device or the like, it is easier for the generating section to acquire information concerning the production unit in the injection molding machine. Therefore, the generating section can generate the common identifier for each of predetermined production units according to simple control.

(3) In the aspect, the generating section may transmit the common identifier to the peripheral device not via the control device. According to such an aspect, since the number of times transmission of data from the control device to the peripheral device can be reduced, it is possible to reduce a processing load of the control device.

(4) In the aspect, the control device may include the generating section, and the generating section may transmit the common identifier to the injection molding machine and the peripheral device. According to such an aspect, even when the injection molding machine and the peripheral device are not individually communicably configured, it is possible to transmit the common identifier to the peripheral device.

(5) In the aspect, the peripheral device may be any one of a taking-out machine configured to take out the molded article molded by the injection molding machine from the injection molding machine, a working machine configured to machine the molded article, and an inspection device configured to inspect the molded article. According to such an aspect, irrespective of whether the peripheral device is the taking-out machine, the working machine, and the inspection device, it is possible to appropriately correlate the molding data and the post-process data based on the common identifier.

What is claimed is:

1. An injection molding machine management system comprising:
　an injection molding machine including an injection section, a molding section, and a molding processor, the molding processor being programed to:
　　control the injection section and the molding section to perform an injection molding operation to form a first molded article;
　　obtain molding data that is gathered while the first molded article is molded in the injection molding operation; and
　　generate a common identifier relating to the first molded article while the injection molding operation for the first molded article is performed;
　a peripheral device receiving the first molded article from the injection molding machine, the peripheral device including a peripheral processor, the peripheral processor being programed to:
　　receive the common identifier and the molding data for the first molded article from the injection molding machine;
　　perform a peripheral operation to process the first molded article; and
　　obtain peripheral data that is gathered while the first molded article is processed in the peripheral operation; and
　a control device communicably connected to the injection molding machine and the peripheral device via a network to control the injection molding machine and the peripheral device, the control device including a control processor, the control processor being programed to:
　　receive the common identifier and the molding data from the injection molding machine and save the common identifier and the molding data in a memory in correlation with each other;
　　receive the common identifier and the peripheral data from the peripheral device and save the common identifier and the peripheral data in the memory in correlation with each other; and
　　specify a cause of a failure of the first molded article based on the common identifier, the molding data, and the peripheral data when the failure of the first molded article occurs,
　wherein the common identifier includes information corresponding to a shot number for molding the first molded article in the injection molding machine.

2. The injection molding machine management system according to claim 1, wherein
　the molding processor is programed to transmit the common identifier to the peripheral device not via the control device.

3. The injection molding machine management system according to claim 1, wherein the peripheral device is any one of:
　a taking-out machine configured to take out the first molded article molded by the injection molding machine from the injection molding, machine;
　a working machine configured to machine the first molded article; and
　an inspection device configured to inspect the first molded article.

* * * * *